United States Patent [19]

Patton, Jr. et al.

[11] 4,386,167

[45] May 31, 1983

[54] POLYISOCYANURATE POLYMER CONTAINING PENDANT UREA GROUPS, POLYOL DISPERSIONS AND POLYURETHANE COMPOSITIONS PREPARED THEREFROM

[75] Inventors: John T. Patton, Jr., Wyandotte; Thirumurti Narayan, Grosse Ile, both of Mich.

[73] Assignee: BASF Wyandotte Corporation, Wyandotte, Mich.

[21] Appl. No.: 369,373

[22] Filed: Apr. 19, 1982

[51] Int. Cl.$^3$ ............................................. C08G 18/14
[52] U.S. Cl. .................... 521/161; 252/182; 524/314; 524/377; 525/123; 528/49; 528/73; 544/222
[58] Field of Search .............. 521/161; 252/182; 525/123; 528/49, 73; 544/222; 524/314, 377

[56] References Cited

U.S. PATENT DOCUMENTS 4,125,491 11/1978 Gorman ........................... 524/476

*Primary Examiner*—Maurice J. Welsh
*Attorney, Agent, or Firm*—Norbert M. Lisicki

[57] ABSTRACT

Polyisocyanurate polymers containing pendant urea groups are prepared by polymerization of polyisocyanates in organic solvents employing appropriate trimerization catalysts and then end-capping the polyisocyanurate polymer with ammonia or ammonium hydroxide. These end-capped polyisocyanurate polymers which contain pendant urea groups are dispersed in polyols to yield fine particulate dispersions. Cellular and non-cellular urethane products prepared using these dispersions displayed improved physical properties.

27 Claims, No Drawings

POLYISOCYANURATE POLYMER CONTAINING PENDANT UREA GROUPS, POLYOL DISPERSIONS AND POLYURETHANE COMPOSITIONS PREPARED THEREFROM

BACKGROUND OF THE INVENTION

1. Field of the Invention

The present invention relates to polyisocyanurate polymers, to a process for the preparation of polyisocyanurate dispersions, and to cellular and non-cellular compositions with improved properties prepared from said polyisocyanurate dispersions. More particularly, the invention relates to polyisocyanurate polymers containing pendant urea groups, a process for the preparation of polyisocyanurate dispersions of said polymers in polyols, and to cellular and non-cellular polyurethane compositions with unexpected and surprisingly improved properties prepared employing said dispersions.

2. Description of the Prior Art

The prior art generally teaches the preparation of isocyanurate-modified isocyanate products employing a variety of catalysts. Among these are U.S. Pat. No. 3,996,223 which teaches a process for preparing polyisocyanates containing isocyanurate structures by polymerization in the presence of a mixture of Mannich bases and carbamic acid esters. U.S. Pat. No. 3,645,979 teaches the use of an organic phosphine catalyst to prepare isocyanurate structures. U.S. Pat. No. 3,652,424 teaches a process for the preparation of polyisocyanate compositions containing 5 to 19 percent by weight toluene diisocyanate trimer employing substituted guanidines and isobiguanides as catalysts. U.S. Pat. No. 4,125,491 teaches the preparation of a composition of matter which consists of the reaction product of trimerized toluene diisocyanate with about 0.02 to 0.25 equivalent, based on free isocyanate groups, of an active hydrogen compound which may either be a secondary aliphatic monoamine containing 24 to 36 carbon atoms or a mixture of such amine with an aliphatic alcohol containing 12 to 24 carbon atoms and dispersed in a mixture of toluene and heptane. Not more than 25 percent of the free NCO groups are allowed to react with the active hydrogen compounds. This patent further teaches the use of the dispersions as adhesives or surface coating compositions. Neither the dispersion in polyether polyol or polyester polyol nor polyurethane compositions using the dispersion of the instant invention are taught in this patent. Copending patent application Ser. No. 225,935, filed January 19, 1981 and now U.S. Pat. No. 4,359,541, issued Nov. 16, 1982, teaches the preparation of polyisocyanurate polymer wherein the available isocyanate groups are reacted with monofunctional active hydrogen compounds and additionally with amines to form biurets. The instant invention is directed to polyisocyanurate polymer-containing pendant urea groups and dispersions of said polymer in a polyol, which when employed for the preparation of cellular and non-cellular polyurethane products result in products with improved physical properties.

SUMMARY OF THE INVENTION

The present invention relates to the preparation of polyisocyanurate polymers which contain pendant urea groups and to dispersions of these polymers in polyols. The cellular and non-cellular polyurethane products prepared from these polyisocyanurate polyol dispersions display improved physical properties.

DESCRIPTION OF THE PREFERRED EMBODIMENT

In accordance with the invention, polyisocyanurate polymers containing pendant urea groups are prepared by polymerization of polyisocyanates using appropriate trimerization catalysts. The polyisocyanates may be partially reacted with ammonia prior to trimerization. The residual free isocyanate (NCO) is reacted with ammonia after polymerization. These polyisocyanurate polymers are then dispersed in polyols. The dispersions of the polyisocyanurate polymers in polyols are employed for the preparation of cellular and non-cellular polyurethane products. The polyisocyanurate polymers and dispersions thereof are prepared by procedures A–D.

Procedure A

A polyisocyanurate polymer is prepared by (a) polymerizing an organic polyisocyanate in an organic solvent in the presence of an effective amount of a trimerization catalyst, (b) deactivating the catalyst, and (c) reacting the free isocyanate groups in the polyisocyanurate polymer with ammonia gas or an ammonium hydroxide solution. The extent of polymerization is monitored by measuring the free NCO content of the mixture. After the free NCO content of the mixture was decreased to about 25 percent from the original content, the residual free NCO groups are reacted with the ammonia or ammonium hydroxide.

Procedure B

In another embodiment, a polyisocyanurate polymer is prepared by (a) partially reacting an organic polyisocyanate with a ammonia or ammonium hydroxide, (b) polymerizing said pre-reacted polyisocyanate in an organic solvent and in the presence of an effective amount of a trimerization catalyst, (c) deactivating said catalyst, and (d) reacting the residual free isocyanate with ammonia or ammonium hydroxide.

Procedure C

In still another embodiment, a polyisocyanurate polymer is prepared by (a) polymerizing an organic polyisocyanate in the presence of a dispersion stabilizer compound, in an organic solvent and in the presence of an effective amount of a trimerization catalyst, (b) deactivating the catalyst, and (c) reacting the residual free isocyanate with a ammonia or ammonium hydroxide.

Procedure D

A further embodiment is a polyisocyanurate polymer prepared by (a) polymerizing an organic polyisocyanate in an organic solvent in the presence of an effective amount of a trimerization catalyst to a free NCO content of about 25 percent of the original content, (b) deactivating said trimerization catalyst, and (c) reacting the residual free isocyanate with ammonia or ammonium hydroxide in the presence of a stabilizer compound (infra). The products of procedures A–D are then mixed with a polyol and the organic solvent is removed by any appropriate means.

More specifically, the polyisocyanurate polymer may be prepared by the polymerization of a 5 to 50 percent solution of an organic polyisocyanate in ethyl acetate or any other suitable solvent in the presence of catalytic quantities of a trimerization catalyst. The temperature of the mixture is maintained at about 50° C. for up to 4 hours at which time the free NCO value of the reaction mixture is reduced to the desired value. Benzoyl chloride, equal in weight to that of the trimerization catalyst, is then added to deactivate said catalyst. After maintaining the reaction temperature at 50° C. for about 15 minutes, ammonia, ammonium hydroxide and/or a dispersion stabilizer compound are reacted with the residual NCO groups. This mixture is allowed to react at 50° C. for 2 hours. The reaction contents are then transferred into the desired polyol while the polyol is stirred at high speeds. The solvent is removed by stripping at pressures below 10 millimeters Hg and maximum temperatures of 70° C. to 80° C.

In the event procedure B or C is employed, the organic polyisocyanate and the ammonia or ammonium hydroxide are reacted with 25 percent or less of the free isocyanate groups originally present in the polyisocyanate prior to trimerization. Any of the polymers produced by procedures A, B, C or D may be dispersed in a polyol using the procedures as disclosed above. Either during the mixing or solvent stripping operation, the temperature of the dispersion is preferably not allowed to increase above 100° C. The concentration of polyisocyanate polymer dispersed in the polyol may range from 1 to 80 percent by weight, preferably from 5 to 50 percent by weight.

The products of the invention may be represented by the following equation:

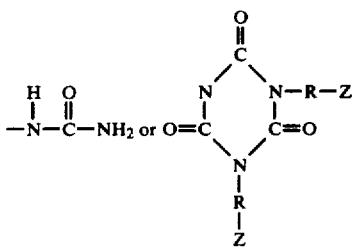

When a reaction stabilizer is present, a minor portion of the Z structure may also be

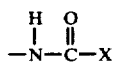

where X is the residue of the reactive stabilizer described below after the removal of a hydrogen atom.

·The free isocyanate (NCO) contents are determined by methods well known to those skilled in the art. These include the titration of a solution of the polyisocyanate compound with a solution of dibutylamine followed by back titration of the excess unreacted amine with an alcoholic HCl solution. The polyisocyanurate polymers are essentially free of the starting polyisocyanate monomer.

The dispersions of the subject polymers may be prepared by adding the solution of the finely divided

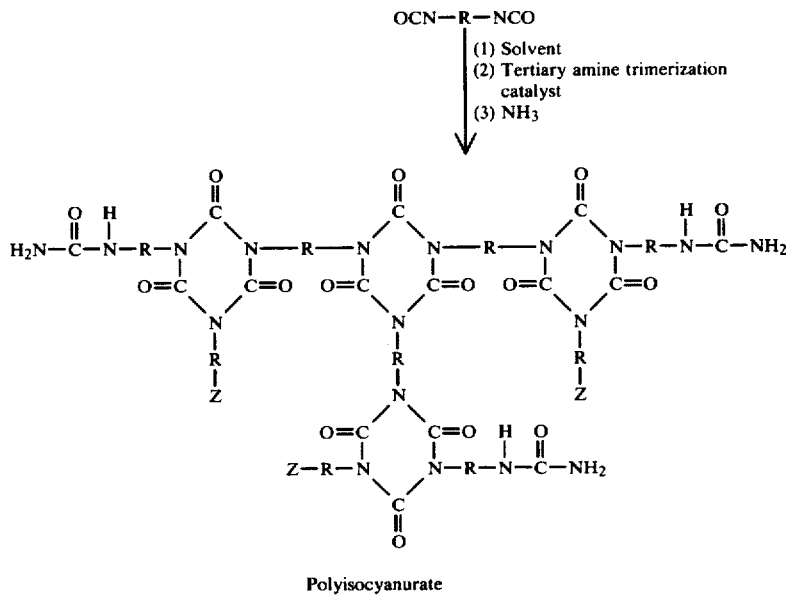

Polyisocyanurate wherein R = Polyvalent organic radical which is either aliphatic, aralykyl, aromatic, or mixtures thereof, and Z is either polyisocyanurate polymer containing pendant urea groups into the polyol which is being stirred at a very rapid rate. During the mixing operation, the temperature of the dispersion is not allowed to increase above 100° C. The concentration of polyisocyanurate polymer dispersed in the polyol may range from 1 to 80 percent by weight, preferably from 5 to 50 percent by weight.

The dispersion stabilizer compounds are selected from the group consisting of polyisocyanate adducts of monofunctional active hydrogen compounds polyisocyanate adducts of difunctional active hydrogen compounds and siloxane-oxyalkylene block copolymers.

The active hydrogen compounds include alcohols, amines, glycols and alkylene oxide adducts of amines, alcohols and glycols. The dispersion stabilizer compounds are employed in such concentrations that they will react with from 1 to 25 percent of the free NCO groups originally present in the monomeric polyisocyanate. The siloxane-oxyalkylene block copolymers are employed at a concentration ranging from 1 to 10 percent based on the polyisocyanate, preferably from 2 to 5 percent.

Among the monofunctional active hydrogen compounds which may be employed as stabilizer compounds in the invention are those saturated alcohols which have the following formula:

$$C_nH_{2n+1}OH$$

wherein n is 1 to 20. Those contemplated include alcohols such as methyl, ethyl, normal propyl and isopropyl, primary, secondary and tertiary butyl, primary, secondary and tertiary amyl, hexyl, heptyl, octyl, nonyl, decyl, undecyl, eicosyl, methylpentyl, 2-ethylbutyl, 2-ethylhexyl, methylamyl, 2-octanol, 2,6-dimethyl-4-heptanol, 2,6,8-triethyl-4-nonanol and mixtures thereof.

Unsaturated alcohols having the formula $$C_nH_{2n-1}OH$$

wherein n is 2 to 20, may also be employed. These include such alcohols as allyl and allyl alcohol.

Other monofunctional active hydrogen compounds which may be employed as dispersion stabilizer compounds are the alkylene oxide adducts of monofunctional active hydrogen compounds. These adducts may be homopolymers, block copolymers of 2 or more alkylene oxides or random copolymers of mixtures of alkylene oxides. The alkylene oxides may contain from 2 to 4 carbon atoms. The adducts have the following formula:

$$(C_nH_{2n+1}O)(C_2H_4O)_x(C_3H_6O)_y(C_4H_8O)_zH$$

wherein n is 1 to 20, x is 0 to 60, y is 0 to 60, and z is 0 to 60 provided that if x and y are 0 then z must be at least 1, if x and z are 0 then y must be at least 1, and if y and z are 0 then x must be at least 1.

The amines which may be employed as dispersion stabilizer compounds in the invention have the following formula:

$$\begin{array}{c} R'' \\ | \\ R'-N-H \end{array}$$

wherein R' and R" may be identical or different, R' and R" may be H or alkyl radicals containing from 1 to 20 carbon atoms, phenyl or benzyl.

Those contemplated include ammonia, methylamine, ethylamine, propylamine, dimethylamine, methylethylamine, diethylamine, diisopropylamine, di-n-propylamine, diallylamine, diisobutylamine, di-n-butylamine, N-methylbenzylamine, phenylethylamine, N-ethylbenzylkamine, di-n-amylamine, dibenzylamine, and diphenylamine, n-octylamine, 2-ethylhexylamine, n-dodecylamine, tetradecylamine, cocoamine, n-hexydecylamine, n-octadecylamine, tallow amine, hydrogenated tallow amine, allylamine, soyamine, dihydrogenated tallow amine, dicocoamine and mixtures thereof. Also included are the primary and secondary amines which have the above formula containing from 1 to 20 carbon atoms, and which have been oxyalkylated with from 1 to 60 moles of ethylene, propylene or butylene oxide per mole of secondary amine.

Still other monofunctional active hydrogen compounds which may be employed as dispersion stabilizer compounds are the monocarboxylic acids containing from 1 to 20 carbon atoms. Among these acids are formic, acetic, propionic, butanoic, pentanoic, hexanoic, caprylic, capric, lauric, myristic, coco, palmitic, stearic, oleic and mixtures thereof.

The glycols which may be employed are ethylene glycol, propylene glycol, dipropylene glycol, 1,4-butanediol, 1,5-pentanediol, 1,6-hexanediol and 1,7-heptanediol and the like. The alkylene oxide adducts of these glycols have the following formula:

$$(Y)(C_2H_4O)_x(C_3H_6O)_y(C_4H_8O)_zH$$

wherein Y is the residue of an organic compound selected from the group consisting of ethylene glycol, propylene glycol, dipropylene glycol, 1,4-butanediol, 1,5-heptanediol, 1,6-hexanediol, 1,7-heptanediol and the like minus the terminal hydrogens, x is 0 to 60, y is 0 to 60, and z is 0 to 60 provided that if x and y are 0, then z must be at least 2; if x and z are 0 then y must be at least 2; and if y and z are 0, then x must be at least 2. In addition, water may be used as the starting compound.

The siloxane-oxyalkylene block copolymers have the formula:

$$Q_3SiO(Q_2SiO)_n[Q''O(C_aH_{2a}O)_bC_xH_{2x}O_zSiO]_ySiQ_3$$

wherein z has a value of 0 or 1, n has a value from 2 to 7 inclusive, y has a value from 1 to 6 inclusive, a has a value from 2 to 4 inclusive, x has a value from 2 to 4 inclusive, b has a value from 0 to 10 inclusive, Q" is a member selected from the class consisting of an alkyl radical, an ary radical, an aralkyl radical, an acyl radical, a carbamyl radical and a carbonate radical and Q is a monovalent hydrocarbon radical containing 1 to 10 carbon atoms or the formula $$\begin{array}{c} Q'O(C_3H_6O)_m(C_2H_4O)_nQ \\ | \\ Me_3SiO(Me_2SiO)_x(MeSiO)_ySiMe_3 \end{array}$$

wherein Q' is a monovalent hydrocarbon group containing from 1 to 10 carbon atoms, Q is an alkylene group containing at least 2 carbon atoms, m and n are numbers, the sum of m+n is such that the oxyalkylene block, $Q'O(C_3H_6O)_m(C_2H_4O)_n$ has a molecular weight of at least 1500, from 15 to 60 weight percent of the oxyalkylene units are oxyethylene units, x has a value of at least 40, y has a value of at least 3, the siloxane block constitutes from 15 to 70 weight percent of the block copolymer, and Me is a methyl group.

The organic polyisocyanate employed in the instant invention corresponds to the formula Z'(NCO)z where Z' is a polyvalent organic radical which is either aliphatic, arylalkyl, alkylaryl, aromatic or mixtures thereof and z is an integer which corresponds to the valence of Z' and is at least 2. Representative of the types of organic polyisocyanates contemplated herein include, for example, 1,2-diisocyanatoethane, 1,3-diisocyanatopropane, 1,2-diisocyanatopropane, 1,4- diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyantooctane, 1,5-diisocyanato-2,2,4-trimethylpentane, 1,9-diisocyanatononane, 1,10-diisocyanatopropyl ether of 1,4-butylene glycol, 1,11-diisocyanatoundecane, 1,12-diisocyanatododecane, bis(isocyanatohexyl) sulfide, 1,4-diisocyanatobenzene, 1,3-diisocyanato-o-xylene, 1,3-diisocyanato-p-xylene, 1,3-diisocyanate-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, 1,4-cyclohexane diisocyanate, hexahydrotoluene diisocyanate, 1,5-naphthylene diisocyanate, 1-methoxy-2,4-phenylene diisocyanate, 2,4'-diphenylmethane diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate and mixtures thereof.

The polyisocyanurate polymers of the instant invention may be prepared by employing well-known compounds as trimerization catalysts. Examples of these catalysts are (a) organic strong bases, (b) tertiary amine co-catalyst combinations, (c) Friedel Craft catalysts, (d) basic salts of carboxylic acids, (e) alkali metal oxides, alkali metal alcoholates, alkali metal phenolates, alkali metal hydroxides and alkal metal carbonates, (f) onium compounds from nitrogen, phosphorus, arsenic, antimony, sulfur and selenium, and (g) mono-substituted monocarbamic esters. These include 1,3,5-tris(N,N-dialkylaminoalkyl)-s-hexahydrotriazines; the alkylene oxide and water additives of 1,3,5-tris(N,N-dialkylaminoalkyl)-s-hexahydrotriazines; 2,4,6-tris(dimethylaminomethyl)phenol; ortho, para- or a mixture of o- and p-dimethylaminomethyl phenol and triethylenediamine or the alkylene oxide and water adducts thereof, metal carboxylates such as lead octanoate, sodium and potassium salts of hydroxamic acid, and organic boron-containing compounds. Monofunctional alkanols containing from 1 to 24 carbon atoms, epoxides containing 2 to 18 carbon atoms and alkyl carbonates may be used in conjunction with tertiary amine to accelerate the rate of the polymerization reaction. The concentration of trimerization catalysts that may be employed in the present invention is from 0.001 part to 20 parts of catalyst per 100 parts of organic polyisocyanate. The temperature ranges which may be employed for the polymerization reaction may range from 25° C. to 230° C., preferably from 25° C. to 120° C. The trimerization catalysts may be deactivated employing an acid or an acid chloride. Acids such as hydrochloric acid, sulfuric acid, acetic acid, oxalic acid, phosphonic acid, methanesulfonic acid, trifluoromethanesulfonic acid, benzene-, toluene- or xylenesulfonic acids, and acid chlorides such as acetyl or benzoyl chloride, and sulfonyl chlorides such as benzene, toluene or xylene sulfonyl chloride may be employed. Another series of deactivators are alkylating agents such as dimethyl sulfate, o-, or p-alkyl toluenesulfonates and methyl chloride which may also be employed.

The solvents which may be employed are those in which the organic polyisocyanates are soluble. These include, for example, acetone, acetonitrile, acetophenone, allyl acetate, bromobenzene, o-bromostyrene, o-bromotoluene, p-bromotoluene, butyl acetate, 2-butyl acetate, butyl benzoate, N-butylcyclohexane, carbon tetrachloride, 2-chloro-1,3-butadiene, chloroform, cyclohexane, cyclohexanone, dibutyl maleate, dibutyl phthalate, o-dichlorobenzene, m-dichlorobenzene, p-dichlorobenzene, 1,1-dichloroethane, dichloromethane, 1,1-diethoxybutane, 1,1-diethoxyethane, diethyl maleate, diethyl phthalate, diethyl pimelate, diethyl succinate, diglycol diacetate, 1,3-dimethoxybutane, 1,1-dimethoxyethane, 3,3-dimethyl-2-butanone, 3,3-dimethylbutyl acetate, dimethyl phthalate, dimethyl pimelate, 2,5-dimethyltetrahydrofuran, 1,4-dioxane, 1,3-dioxolane, diphenyl ether, ethyl acetate, ethyl acrylate, ethyl butyrate, diethyl ether, ethyl formate, 2-ethylhexyl acetate, ethyl propionate, m-ethyltoluene, o-ethyltoluene, p-ethyltoluene, glyceryl triacetate, glycol diacetate, glycol dipropionate, 2-heptanone, 3-heptanone, 4-heptanone, 3-hepten-2-one, 2-heptyl acetate, 3-heptyl acetate, hexyl acetate, hexyl acrylate, hexylene glycol diacetate, hexyl hexanoate, 5-methyl-2-hexanone, methyl propionate, 3-methylthiophene, 2-methylthiophene, 2-octanone, 3-pentanone, propyl acetate, propylene dichloride, toluene, 1,1,2-trichloroethane, trichloroethylene, 1,2,3-trichloropropane, m-xylene, o-xylene, p-xylene, dimethyl formamide, dimethyl acetamide, dimethyl sulfoxide, N-methyl pyrrolidone, tetramethylene sulfone.

In accordance with the present invention, rigid, flexible, and microcellular foams may be prepared by the catalytic reaction of organic polyisocyanates with polyols containing therein the dispersed polyisocyanurate polymer in the presence of blowing agents, surfactants and other additives which may be deemed necessary. Non-cellular products may also be prepared in the absence of blowing agents.

Typical polyols which may be employed in the preparation of the foams of the instant invention include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one —SH group and one —OH group as well as those which contain an amino group and a —SH group may be used. Generally, the equivalent weight of the polyols will vary from 100 to 10,000, preferably from 1000 to 3000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)-propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two —SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylene diamine, 1,3-diaminopropane, 1,3-diaminobutane, and 1,4-diaminobutane.

The polyurethane foams of the present invention may also be prepared by the reaction of an organic polyisocyanate with a graft polymer polyol containing therein the dispersed polyisocyanurate polymer of the invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. For the preparation of microcellular foams, blowing agents are generally not necessary. If desired for more expanded foams, blowing agents may be employed. When water is used, corresponding quantities of excess isocyanate to react with the water and produce carbon dioxide are necessary.

It is possible to proceed with the preparation of the polyurethane plastics by a prepolymer technique wherein an excess of organic polyisocyanate is reacted in a first step with the polyol containing the polyisocyanurate dispersion to prepare a prepolymer having free isocyanate groups which is then reacted in a second step with water and, optionally, low molecular weight cross-linking agents such as glycerine and trimethylolpropane, to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

TDH—1,3,5-tris(N,N'-dimethylaminopropyl)-s-hexahydrotriazine

Stabilizer A—a 1:1 propylene oxide:ethylene oxide adduct of n-butanol sufficient to give a hydroxyl number of 76.8

Stabilizer B—a propylene oxide, ethylene oxide adduct of propylene glycol having an equivalent weight of 1435 and containing 30 percent ethylene oxide Stabilizer C—a 1:1 propylene oxide:ethylene oxide adduct of n-butanol sufficient to give a hydroxyl number of 31.9

Stabilizer D—DC 5043—silicone surfactant manufactured by Dow Corning

Stabilizer E—DC 193—silicone surfactant manufactured by Dow Corning

Stabilizer F—a 1:1 propylene oxide:ethylene oxide adduct of n-butanol sufficient to give a hydroxyl of 14

T-12—Dibutyltin dilaurate, M & T

DABCO WT—Amine catalyst, a product of Air Products Corporation

TDI—(80/20) 2,4-', 2,6'-toluene diisocyanate

L-5303—silicone surfactant, a product of Union Carbide Corporation

MDI—diphenylmethane diisocyanate

Crude MDI—polymethylene polyphenylene polyisocyanate

Polyol A—a propylene oxide-ethylene oxide adduct of a mixture of glycerine and propylene glycol containing 14 percent ethylene oxide, having a hydroxyl number of 35 and containing 0.3 moles of unsaturation per mole of polyol Polyol B—a propylene oxide-ethylene oxide adduct of trimethylolpropane containing 13 percent ethylene oxide and having a hydroxyl number of 35

Polyol C—a propylene oxide-ethylene oxide adduct of glycerine containing 5 percent ethylene oxide and having a hydroxyl number of 35

Polyol D—a propylene oxide adduct of a mixture of glycerine and propylene glycol having a hydroxyl number of 58

Polyol E—a propylene oxide-ethylene oxide adduct of trimethylolpropane containing 15 percent ethylene oxide ad having a hydroxyl number of 25

The following examples are intended to examplify the invention. All parts are by weight unless otherwise designated.

EXAMPLES 1-40

A 1 liter reaction vessel equipped with a mechanical stirrer, thermometer, addition funnel and a reflux condenser was purged with nitrogen. Anhydrous ethyl acetate, (200 grams), 200 grams of toluene and 100 grams of TDI were charged. The NCO content of the solution was 9.7 percent by weight. TDH (0.58 grams) catalyst was added dropwise. An exotherm developed and reached a temperature of 42° C. Thereafter, the reaction vessel was heated to 50° C. and maintained at 50° C. for 3 hours. The free NCO content of the reaction solution was 3.69 percent by weight. The reaction solution was substantially free of monomeric TDI. At this stage, while maintaining the pot temperature at 50° C., 0.58 grams of benzoyl chloride was added dropwise to deactivate the catalyst. The reaction was then allowed to stir at 50° C. for 15 minutes. Stabilizer A (10 grams) was then added and the temperature maintained at 50° C. A total of 7.9 grams (10 percent excess) of ammonia gas was bubbled into the reaction mixture over a period of 30 minutes during which time the pot turned milky and gradually formed significant amount of white particulate material. After the addition of the ammonia gas had been completed, the reaction mixture was allowed to stir for another 2 hours at 50° C. or higher. The reaction contents were then transferred as a thin stream into 479 grams of polyol A while the polyol was being rapidly stirred with a homogenizer. After the addition has been completed, the mixture was homogenized for 15 minutes. Ethyl acetate and toluene were then stripped under reduced pressure. After the stripping had been completed, the dispersion was further homogenized for 15 minutes. The resulting product of Example 2 had a Brookfield viscosity of 3,240 cps at 25° C. The experimental conditions including stabilizers, polyols and concentrations thereof employed for the preparation of the dispersions, and the resulting properties thereof are summarized in Table I. The amount of polyol employed in all examples was 20 grams.

TABLE I

| Example | Initial % NCO | % NCO after polymerization | Stabilizer (g) | Ammonia added (g) | Polyol (g) | Viscosity cps/25° C. | OH No. | Mean Particle Diameter - microns |
| --- | --- | --- | --- | --- | --- | --- | --- | --- |
| 1 | 9.7 | 3.68 | A (10) | 7.9 | A | 4160 | — | — |
| 2 | 9.7 | 3.69 | A (10) | 7.9 | A | 3240 | — | 7.28 |
| 3 | 9.7 | 3.74 | B (2) | 8.4 | A | 4640 | — | — |
| 4 | 9.7 | 3.52 | C (10) | 7.7 | A | 3080 | — | 7.22 |

TABLE I-continued

| Example | Initial % NCO | % NCO after polymerization | Stabilizer (g) | Ammonia added (g) | Polyol (g) | Viscosity cps/25° C. | OH No. | Mean Particle Diameter - microns |
|---|---|---|---|---|---|---|---|---|
| 5 | 9.7 | 3.57 | A (10) | 7.7 | B | 3880 | — | 8.63 |
| 6 | 9.7 | 3.79 | A (10) | 8.1 | C | 3480 | — | 6.22 |
| 7 | 9.7 | 3.60 | A (10) | 7.7 | D | 2680 | — | 6.60 |
| 8 | 9.7 | 3.68 | A (10) | 7.9 | E | 5520 | — | 8.25 |
| 9 | 9.7 | 3.35 | A (10) | 7.2 | A | 4040 | — | 3.64 |
| 10 | 9.7 | 2.84 | A (10) | 6.1 | A | 3920 | — | 4.43 |
| 11a | 12.1 | 4.4 | A (10) | 7.6 | A | 3000 | — | — |
| 12b | 9.7 | 3.7 | A (10) | 15.7 | A | 3280 | 28 | — |
| 13b | 9.7 | 3.5 | A (10) | 15.3 | A | 4040 | — | — |
| 14c | 9.7 | 4.02 | A (10) | 8.7 | A | 2440 | 23.8 | 5.30 |
| 15 | 9.7 | 3.83 | A (10) | 8.3 | A | 3240 | — | — |
| 16 | 9.7 | 3.51 | A (10) | 7.6 | A | 2840 | — | 4.71 |
| 17 | 9.7 | 3.6 | A (10) | 15.5 | A | 3280 | 27.3 | 6.55 |
| 18 | 9.7 | 3.8 | A (10) | 16.5 | A | 3340 | 27.0 | — |
| 19 | 9.7 | 3.8 | A (10) | 8.3 | A | 3100 | 26.5 | — |
| 20 | 9.7 | 3.6 | D (1) | 8.0 | A | 3360 | 26.6 | 5.08 |
| 21 | 9.7 | 3.7 | E (1) | 8.3 | A | 3120 | 27.1 | — |
| 22 | 9.7 | 3.9 | D (5) | 8.6 | A | 6240 | — | — |
| 23b | 9.7 | 3.9 | D (1) | 17.3 | A | 3280 | — | 7.47 |
| 24b | 9.7 | 3.9 | D (1) | 17.3 | A | 5520 | 21.4 | 4.38 |
| 25b | 9.7 | 3.9 | D (2) | 17.2 | A | 3400 | 27.4 | 6.34 |
| 26 | 9.7 | 3.95 | F (10) | 8.7 | A | 3900 | 24.3 | 2.45 |
| 27 | 9.7 | 3.7 | A (10) | 8.0 | A | 2360 | 30.2 | 8.41 |
| 28 | 9.7 | 3.6 | A (10) | 7.8 | A | 2580 | 28.5 | 3.69 |
| 29a | 9.7 | 3.98 | A (10) | 8.6 | A | 1840 | 28.7 | — |
| 30b | 9.7 | 3.76 | A (10) | 16.2 | A | 2780 | 27.7 | 8.26 |
| 31b | 9.7 | 3.86 | A (10) | 16.7 | A | 2840 | — | 2.99 |
| 32 | 9.7 | 3.81 | A (10) | 8.3 | B | 3260 | 26.9 | 3.93 |
| 33 | 9.7 | 3.87 | F (10) | 8.4 | A | 2480 | — | 4.22 |
| 34 | 9.7 | 3.8 | A (10) | 15.0 | A | 2640 | 29.1 | 3.2 |
| 35 | 9.7 | 3.74 | A (10) | 14.6 | A | 2600 | 28.4 | 8.35 |
| 36 | 9.7 | 3.71 | A (10) | 14.6 | A | 2660 | 27.4 | 7.47 |
| 37b | 9.7 | 3.76 | A (10) | 29.4 | A | 2940 | — | 5.90 |
| 38e | 9.7 | 3.72 | A (10) | 27.3 | A | 3100 | — | — |
| 39e | 9.7 | 3.58 | None | 27.0 | A | 3100 | — | — |
| 40e | 9.7 | 3.68 | A (10) | 27.0 | A | 2800 | — | — |

Example 24 is a 30% dispersion
a 100 gram ethyl acetate, 150 gram toluene
b 2 fold increase in amounts employed
c 200 gram ethyl acetate, 200 gram methylene chloride
d 200 gram ethyl acetate, 200 gram hexane
e ammonium hydroxide employed

EXAMPLES 41-65

The designated polyisocyanurate dispersion (300 grams), 9.0 grams of water, 4.0 grams of L-5303, 2.1 grams of Dabco WT were mixed for 30 seconds using a Lightnin Model V-7 stirrer equipped with a 1.5 inch shrouded mixing blade. Whereupon 0.1 gram of T-12 was added and the mixture was mixed for another 15 seconds. A TDI/crude MDI (80/20) mixture was added, mixed for 5 seconds, poured into a one-gallon container and the foam was allowed to rise. The resulting foam was cured at 110° C. for 8 minutes. The polyisocyanurate dispersions employed and the physical properties of the foams are shown in Tables II to V below. The polyisocyanurate dispersions of Comparative Examples 41 and 42 were prepared by reacting the residual free NCO after trimerization with n-butanol as taught by copending patent application Ser. No. 225,935. Examples 43 and 44 were prepared by the process of the instant invention wherein the residual free NCO was reacted with ammonia. The products of Examples 43-65 display unexpected improved load bearing, low compression set and flame retardancy compared to Comparative Examples 41 and 42. The particle diameters were determined by laser light scattering techniques.

TABLE II

| | Comparative Examples | | | |
|---|---|---|---|---|
| Examples | 41 | 42 | 43 | 44 |
| Physical Properties | | | | |
| Density, pcf | 1.77 | 1.73 | 1.83 | 1.81 |
| Tensile Strength, psi | 13.4 | 15.0 | 14.6 | 12.3 |
| Elongation, % | 147. | 160. | 90. | 100. |
| Tear Strength, pi | 2.2 | 2.1 | 1.6 | 1.7 |
| ILD, lbs./sq.in., 50% deflection | 1.4 | 1.2 | 1.5 | 1.5 |
| CLD, psi, 50% deflection | 0.45 | 0.38 | 0.52 | 0.53 |
| Compression sets, | | | | |
| % set at 50% compression | 18. | 25. | 13. | 12. |
| % set at 90% compression | 33. | 83. | 12. | 11. |
| Air flow, cfm, 0.5" $H_2O$ | 1.76 | 1.37 | 2.25 | 1.97 |
| California No. 117 Flame Test | Failed | Failed | Passed | Passed |

TABLE III

| Examples | 45 | 46 | 47 | 48 | 49 | 50 |
|---|---|---|---|---|---|---|
| Dispersions of Examples | 1 | 15 | 39 | 2 | 16 | 4 |
| Physical Properties | | | | | | |
| Density, pcf | 1.83 | 1.97 | 1.75 | 1.78 | 1.85 | 1.81 |
| Tensile Strength, psi | 14.6 | 15.3 | 12.2 | 13.9 | 12.1 | 12.3 |
| Elongation, % | 90. | 90. | 87. | 97. | 97. | 100. |
| Tear Strength, pi | 1.6 | 1.6 | 1.4 | 1.6 | 1.5 | 1.7 |
| ILD, lbs./1 sq. in. load at 50% deflection | 1.5 | 1.9 | 1.5 | 1.4 | 1.5 | 1.5 |
| CLD, psi load at 50% deflection | 0.52 | 0.63 | 0.47 | 0.47 | 0.52 | 0.53 |

TABLE III-continued

| Examples | 45 | 46 | 47 | 48 | 49 | 50 |
|---|---|---|---|---|---|---|
| Compression sets, % | | | | | | |
| 50% compression | 12.7 | 15.0 | 12.7 | 12.6 | 13.0 | 11.7 |
| 90% compression | 12.1 | 10.6 | 10.1 | 12.5 | 12.4 | 11.0 |
| Air flow, cfm at 0.5" $H_2O$ | 2.25 | 1.13 | 2.17 | 2.66 | 1.58 | 1.97 |
| California No. 117 Flame Test | | | | | | |
| Afterflame, sec. | | | | | | |
| av. | 1.9 | 2.1 | 1.2 | 1.1 | 2.2 | 1.6 |
| max. | 4.9 | 3.0 | 3.0 | 2.3 | 3.0 | 3.0 |
| Char length, inches | | | | | | |
| av. | 3.0 | 2.8 | 5.7 | 3.0 | 4.1 | 4.1 |
| max. | 3.2 | 3.3 | 12. | 3.8 | 7.5 | 6.2 |

TABLE IV

| Examples | 51 | 52 | 53 | 54 | 55 | 56 | 56 | 58 | 59 |
|---|---|---|---|---|---|---|---|---|---|
| Dispersions of Examples | 8 | 10 | 11 | 13 | 17 | 18 | 12 | 19 | 20 |
| Physical Properties | | | | | | | | | |
| Density, pcf | 2.01 | 1.72 | 1.7 | 1.73 | 1.76 | 1.82 | 1.74 | 1.74 | 1.76 |
| Tensile Strength, psi | 12.4 | 10.6 | 10.1 | 10.5 | 11.1 | 11.0 | 10.0 | 11.5 | 11.5 |
| Elongation, % | 133. | 90. | 100. | 73. | 97. | 100. | 97. | 100. | 103. |
| Tear Strength, pi | 2.2 | 1.4 | 1.4 | 1.2 | 1.5 | 1.6 | 1.4 | 1.4 | 1.7 |
| ILD, lbs./1 sq. in. | | | | | | | | | |
| load at 50% deflection | 1.4 | 1.4 | 1.3 | 1.2 | 1.2 | 1.3 | 1.0 | 1.2 | 1.1 |
| CLD, psi | | | | | | | | | |
| load at 50% deflection | 0.51 | 0.50 | 0.42 | 0.41 | 0.44 | 0.44 | 0.37 | 0.40 | 0.37 |
| Compression sets, % | | | | | | | | | |
| 50% compression | 9.6 | 11.8 | 11.0 | 11.1 | 9.5 | 12.3 | 9.6 | 9.7 | 9.3 |
| 90% compression | 8.4 | 9.8 | 9.1 | 9.8 | 9.6 | 8.8 | 9.4 | 9.3 | 8.2 |
| Air flow, cfm at 0.5" $H_2O$ | 2.72 | 1.85 | 2.60 | 1.76 | 3.20 | 3.50 | 4.20 | 3.0 | 3.20 |
| California No. 117 Flame Test | | | | | | | | | |
| Afterflame, sec. | | | | | | | | | |
| av. | 4 | 11 | 0 | 0 | 1 | 0 | 0 | 0 | 9.3 |
| max. | 8 | 33 | 0 | 0 | 4 | 0 | 0 | 0 | 20.0 |
| Char length, inches | | | | | | | | | |
| av. | 2.5 | 4.5 | 3.9 | 3.4 | 3.3 | 3.3 | 3.2 | 3.3 | 3.7 |
| max. | 2.9 | 6.1 | 4.5 | 3.5 | 3.4 | 3.6 | 3.5 | 3.9 | 4.9 |

TABLE V

| Examples | 60 | 61 | 62 | 63 | 64 | 65 |
|---|---|---|---|---|---|---|
| Dispersions of Examples | 25 | 26 | 34 | 36 | 37 | 21 |
| Physical Properties | | | | | | |
| Density, pcf | 1.80 | 1.70 | 1.75 | 1.79 | 1.77 | 1.87 |
| Tensile Strength, psi | 11.5 | 10.6 | 10.1 | 11.5 | 10.1 | 11.4 |
| Elongation, % | 110 | 117 | 127 | 123 | 103 | 107 |
| Tear Strength, pi | 1.4 | 1.2 | 1.7 | 1.5 | 1.0 | 1.2 |
| ILD, lbs./1 sq. in., 1% thick | | | | | | |
| load at 50% deflection | 1.5 | 0.9 | 1.2 | 1.3 | 1.3 | 1.5 |
| CLD, psi | | | | | | |
| load at 50% deflection | 0.5 | 0.31 | 0.40 | 0.44 | 0.43 | 0.52 |
| Compression set, % | | | | | | |
| 50% compression | 16.2 | 21.3 | 18.3 | 9.8 | 10.5 | 13.8 |
| 90% compression | 13.1 | 21.9 | 13.1 | 13.7 | 12.3 | 10.8 |
| Air flow, cfm | 2.31 | 1.94 | 3.40 | 3.60 | 4.60 | 2.70 |
| California No. 117 Flame Test | | | | | | |
| Afterflame, sec. | | | | | | |
| av. | 1 | 1 | 0.3 | 0 | 5 | 131 |
| max. | 2 | 1 | 1 | 0 | 16 | 79.3 |
| Char length, inches | | | | | | |
| av. | 3.7 | 3.7 | 2.7 | 3.0 | 4.6 | 9.2 |
| max. | 4.4 | 3.4 | 2.7 | 2.7 | 3.0 | 12 |

The embodiments of the invention in which an exclusive priviledge or property is claimed are defined as follows:

1. A polyisocyanurate polymer containing pendant urea groups prepared by (a) polymerizing an organic polyisocyanate in an organic solvent in the presence of an effective amount of a trimerization catalyst and an organic solvent, (b) deactivating said catalyst, and (c) reacting the residual free isocyanate groups of the polymer with ammonia or ammonium hydroxide.

2. A polyisocyanurate polymer containing pendant urea groups prepared by (a) partially reacting an organic polyisocyanate with ammonia or ammonium hydroxide, (b) polymerizing the product of (a) in an organic solvent in the presence of an effective amount of a trimerization catalyst, (c) deactivating said catalyst, and (d) reacting the residual free isocyanate groups of the polymer with ammonia or ammonium hydroxide.

3. A polyisocyanurate polymer prepared by (a) polymerizing an organic polyisocyanate in the presence of a dispersion stabilizer compound, in an organic solvent in the presence of an effective amount of a trimerization catalyst, (b) deactivating said catalyst, and (c) reacting the residual free isocyanate groups of the polymer with ammonia or ammonium hydroxide.

4. The polyisocyanurate polymer of claim 1 prepared in the presence of an adduct of equivalent quantities of an organic polyisocyanate, and a monofunctional active hydrogen compound.

5. The polyisocyanate polymer of claim 2 prepared in the presence of an adduct of equivalent quantities of an organic polyisocyanate, and a monofunctional active hydrogen compound.

6. The polyisocyanate polymer of claim 3 prepared in the presence of an adduct of equivalent quantities of an organic polyisocyanate and a monofunctional active hydrogen compound.

7. A polyisocyanurate polymer dispersion in a polyol prepared by (a) polymerizing an organic polyisocyanate in an organic solvent in the presence of an effective amount of a trimerization catalyst, (c) deactivating said catalyst, (c) reacting the residual free isocyanate groups of the polymer with ammonia or ammonium hydroxide, (d) mixing the solution with a polyol, and (e) removing the organic solvent.

8. A polyisocyanurate polymer dispersion in a polyol prepared by (a) partially reacting an organic polyisocyanate with ammonia or ammonium hydroxide, (b) polymerizing the product of (a) in an organic solvent in the presence of an effective amount of a trimerization catalyst, (c) deactivating said catalyst, and (d) reacting the residual free isocyanate groups of the polymer with ammonia or ammonium hydroxide.

9. A polyisocyanurate polymer dispersion in a polyol prepared by (a) polymerizing an organic polyisocyanate in the presence of a dispersion stabilizer compound, in an organic solvent in the presence of an effective amount of a trimerization catalyst, (b) deactivating said catalyst, and (c) reacting the residual free isocyanate groups of the polymer with ammonia or ammonium hydroxide.

10. A process for preparing a polyisocyanurate polymer by (a) polymerizing an organic polyisocyanate in an organic solvent in the presence of an effective amount of a trimerization catalyst, (b) deactivating said catalyst, and (c) reacting the available free isocyanate groups of the polymer with ammonia or ammonium hydroxide.

11. A process for preparing a polyisocyanurate polymer by (a) polymerizing an organic polyisocyanate in the presence of a dispersion stabilizer compound, in an organic solvent in the presence of an effective amount of a trimerization catalyst, (c) deactivating said catalyst, and (d) reacting the residual free isocyanate with ammonia or ammonium hydroxide.

12. A process for preparing a polyisocyanurate polymer by (a) partially reacting an organic polyisocyanate with ammonia or ammonium hydroxide, (b) polymerizing the product of (a) in an organic solvent in the presence of an effective amount of a trimerization catalyst, (c) deactivating said catalyst, and (d) reacting the residual free isocyanate groups of the polymer with ammonia or ammonium hydroxide.

13. The process of claim of 10 wherein said polymerization is conducted in the presence of an adduct of equivalent quantities of an organic polyisocyanate, and a monofunctional active hydrogen compound.

14. The process of claim of 11 wherein said polymerization is conducted in the presence of an adduct of equivalent quantities of an organic polyisocyanate, and a monofunctional active hydrogen compound.

15. The process of claim 12 wherein said polymerization is conducted in the presence of an adduct of equivalent quantities of an organic polyisocyanate, and a monofunctional active hydrogen compound.

16. In a polyurethane foam prepared by the reaction of a polyol, an organic polyisocyanate, catalyst, blowing agent and optionally other additives, the improvement comprises the use of a dispersion in said polyol of the polymer prepared by the process of claim 10.

17. In a polyurethane foam prepared by the reaction of a polyol, an organic polyisocyanate, catalyst, blowing agent and optionally other additives, the improvement comprises the use of a dispersion in said polyol of the polymer prepared by the process of claim 11.

18. In a polyurethane foam prepared by the reaction of a polyol, an organic polyisocyanate, catalyst, blowing agent and optionally other additives, the improvement comprises the use of a dispersion in said polyol of the polymer prepared by the process of claim 12.

19. In a polyurethane foam prepared by the reaction of a polyol, an organic polyisocyanate, catalyst, blowing agent and optionally other additives, the improvement comprises the use of a dispersion in said polyol of the polymer prepared by the process of claim 13.

20. In a polyurethane foam prepared by the reaction of a polyol, an organic polyisocyanate, catalyst, blowing agent and optionally other additives, the improvement comprises the use of a dispersion in said polyol of the polymer prepared by the process of claim 14.

21. In a polyurethane foam prepared by the reaction of a polyol, an organic polyisocyanate, catalyst, blowing agent and optionally other additives, the improvement comprises the use of a dispersion in said polyol of the polymer prepared by the process of claim 15.

22. In a non-cellular polyurethane product prepared by the reaction of a polyol, an organic polyisocyanate, catalyst, and optionally other additives, the improvement comprises the use of a dispersion in said polyol of the polymer prepared by the process of claim 10.

23. In a non-cellular polyurethane product prepared by the reaction of a polyol, an organic polyisocyanate, catalyst, and optionally other additives, the improvement comprises the use of a dispersion in said polyol of the polymer prepared by the process of claim 11.

24. In a non-cellular polyurethane product prepared by the reaction of a polyol, an organic polyisocyanate, catalyst, and optionally other additives, the improvement comprises the use of a dispersion in said polyol of the polymer prepared by the process of claim 12.

25. In a non-cellular polyurethane product prepared by the reaction of a polyol, an organic polyisocyanate, catalyst, and optionally other additives, the improvement comprises the use of a dispersion in said polyol of the polymer prepared by the process of claim 13.

26. In a non-cellular polyurethane product prepared by the reaction of a polyol, an organic polyisocyanate, catalyst, and optionally other additives, the improvement comprises the use of a dispersion in said polyol of the polymer prepared by the process of claim 14.

27. In a non-cellular polyurethane product prepared by the reaction of a polyol, an organic polyisocyanate, catalyst, and optionally other additives, the improvement comprises the use of a dispersion in said polyol of the polymer prepared by the process of claim 15.

* * * * *